Oct. 3, 1933.  K. J. DE JUHASZ  1,928,930
KNIFE EDGE BEARING
Filed April 8, 1930
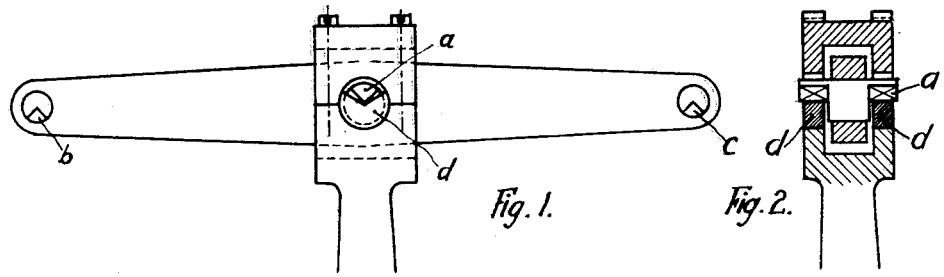
Fig. 1.  Fig. 2.
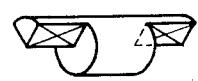 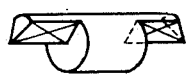  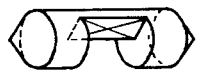
Fig. 3.  Fig. 4.  Fig. 5.  Fig. 6.
    
Fig. 7.  Fig. 8.  Fig. 9.  Fig. 10.  Fig. 11.
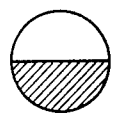   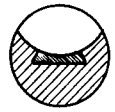
Fig. 12.  Fig. 13.  Fig. 13a.  Fig. 14.
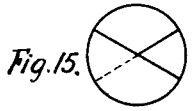 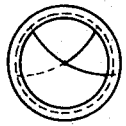 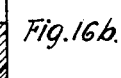
Fig. 15.  Fig. 16.  Fig. 16b.
Fig. 15a.  Fig. 16a.
Inventor:
Kalman John De Juhasz Patented Oct. 3, 1933

1,928,930

UNITED STATES PATENT OFFICE 1,928,930

KNIFE EDGE BEARING

Kalman John De Juhasz, State College, Pa.

Application April 8, 1930. Serial No. 442,551

4 Claims. (Cl. 308—2)

This invention relates to a fulcrum of the knife-edge type of novel construction which comprises two cooperating members, namely the knife-edge, being a hard wedge, and a bearing, being a hard, flat or hollow seat for the knife-edge, each of them being fixed respectively into each of the two elements of machinery which are to be capable of oscillating relative to each other through a limited range of angle.

Fulcrums of the knife-edge type have been used from time immemorial as an axis of motion, for a lever arm or beam in certain machines or instruments of precision, as scales, testing machines, pendulums, etc., to minimize friction.

My improved fulcrum of the knife-edge type is so constructed that it can be easily and accurately located in the cooperating elements of machinery. Furthermore, it lends itself to an easy manufacture with accuracy and interchangeability.

For this purpose the knife-edge is formed of a cylindrical piece of hard material, by machining away part of same in such a manner that a wedge-shaped or sector-like portion remains with the knife-edge formed in the axis of the cylindrical piece. The remaining portion of the cylindrical piece is capable of being accurately located and fixed in a circular hole formed in the rotatable element of machinery.

Likewise, the bearing is formed of a cylindrical (or spherical) body by machining away part of said body in such a manner, that its axis is exposed to provide a seat for the above mentioned knife-edge. The remaining part of the cylindrical (or spherical) surface is capable of being accurately located and fixed in a cylindrical (or spherical) hole formed in the stationary element of machinery.

The advantage of this construction is that the axis of motion lies in the common axis of the cylindrical (or spherical) holes produced respectively in the rotatable element, and in the stationary element of machinery. Both cylindrical (or spherical) holes and cylindrical bodies are easy to produce with great accuracy as to their sizes and relative positions to each other. Furthermore, the insertion of the knife-edge into the rotatable element need not be executed with extreme care, because differing angular positions of the knife-edge do not alter the position of the axis of motion, and, therefore, do not alter the ratio of leverage.

In the accompanying drawing Fig. 1 shows the side elevation and Fig. 2 a sectional view of a balance beam which serves to exemplify the application of the invention. Figs. 3, 4, 5, 6 and 7 show in perspective view different forms and modifications of the knife-edge. Figs. 8, 9, 10 and 11 show different cross-sectional forms of the knife-edge. Figs. 12, 13 and 14 represent in side elevation, Fig. 13a, in sectional view different modifications of the bearing formed of one cylindrical (or spherical) block. Fig. 15 represents in side elevation, and Fig. 15a, in plan view a modification of the bearing formed of two cylindrical blocks. Fig. 16 represents a front elevation, Fig. 16a, in plan view and Fig. 16b, in sectional side view a modification of the bearing formed of two spherical blocks, in which the spherical blocks are inserted into a cylindrical housing, which in turn is to be inserted,—somewhat in the manner of the outer race of a ball bearing—, into the element of machinery.

Referring to Figs. 1 and 2, a balance beam has three knife-edges, $a$, $b$ and $c$ inserted in corresponding holes located on one straight line. (In order to take care of the deflection of the beam the intermediate knife-edge may be located slightly below the straight line connecting the centers of the two outer holes.) On the two outer knife-edges the stirrups holding the pans may be hung, which stirrups are not shown on the drawing. On Fig. 2 the pillar supporting the beam is shown in cross section, clearly showing the manner in which the bearings $d$ are clamped between two hemi-cylindrical surfaces.

The modification of the knife-edge shown on the Fig. 3 is inserted in its middle portion into the beam or other element of machinery. A modification of this is shown in Fig. 4 in which the knife-edge is formed with two sharp points on its end, facilitating sidewise location of same without friction, for example between two suitable stops (not shown on the drawing) designed to limit the possible axial movement of the knife-edge. Fig. 5 shows the knife-edge formed in the middle portion of the cylindrical pin. The modification of this shown on Fig. 6 provides for a limitation of the endwise motion by means of two sharp cones formed in the axis of said cylindrical pin. Fig. 7 shows a single knife-edge designed to be inserted on one side of the element of machinery and rigidly fixed by means of screw and nut.

Fig. 8 shows a cross section of the knife-edge which is formed by two intersecting plane surfaces, such as can be formed by milling or grinding. In the form of cross section shown on Fig. 9 the knife-edge is formed by two intersecting convex cylindrical surfaces such as can be produced by milling, grinding or turning. In the form shown on Fig. 10, the knife-edge is formed by two intersecting concave cylindrical surfaces.

The knife-edge may be formed of one integral cylindrical piece of hard material, or, a piece of hard material, such as stellite, agate, or other stone may be imbedded in the cylindrical pin of soft material, such as brass or bronze. This latter modification is shown on Fig. 11.

Respectively to the construction of the bearing, Fig. 12 shows a form in which the bearing surface is a meridional plane of a cylindrical body. In Fig. 13 the bearing surface is formed of two intersecting meridional planes. Thus the knife-edge is definitely located in the bearing which is an advantage in most cases. In Fig. 14 the bearing has a hollow cylindrical surface. At the same time this Fig. 14 exemplifies the modification in which a piece of hard material is embedded in the comparatively soft cylindrical body. Instead of being cylindrical, the body may have a spherical outside surface which permits its accurate alinement with the knife-edge. This form is exemplified on Figs. 13 and 13a.

Figs. 15 and 15a show a bearing formed of the meridional planes of two hemi-cylindrical discs, placed side by side and designed to be inserted together in a common cylindrical hole. Figs. 16, 16a and 16b show a modification of said bearing in which the two discs are formed with spherical outer surfaces, which admit a self-alignment around the center of the sphere. Furthermore, in this case the individual discs include an angle greater than 180 degrees, which gives the possibility of a firmer location. In this modification the two spherical blocks are permanently inserted in a housing having a cylindrical outer surface which in turn can be inserted in a cylindrical hole.

There are other modifications of my invention possible, for example more than two discs can be used in a bearing. Also, the double disc, or multiple disc type of bearing may be machined out of an integral piece.

Having described my invention, what I claim is:

1. A bearing block for a knife-edge pivot having a spherical outer surface and a V-shaped bearing face for seating the knife-edge pivot, an annular socket-ring having a spherical interior, the bearing block being inserted in, and cooperating with the spherical interior of the annular socket ring.

2. A bearing block for a knife-edge pivot formed by two discs having a common spherical outer surface and oppositely inclined bearing faces forming a V-shaped notch for seating the knife-edge pivot, an annular socket ring having a spherical interior, the bearing block being inserted in, and cooperating with the spherical interior of the annular socket ring.

3. A bearing block for a knife-edge pivot formed by a number of discs having a common spherical outer surface and alternately inclined bearing faces forming a V-shaped notch for seating the knife-edge pivot, an annular socket ring having a spherical interior, the bearing block being inserted in, and cooperating with the spherical interior of the annular socket ring.

4. A bearing block for a knife-edge pivot, having a spherical outer surface and a number of alternately inclined bearing faces, machined in the solid block, forming a V-shaped notch for seating the knife-edge pivot, an annular socket ring having a spherical interior, the bearing block being inserted in, and cooperating with the spherical interior of the annular socket ring.

KALMAN JOHN DE JUHASZ.